June 14, 1966  C. COLE ETAL  3,255,537
TEACHING MACHINE

Filed Dec. 28, 1962

INVENTORS
CHARLES COLE
ABRAHAM NYDICK
BY Hane & Nydick
ATTORNEYS

June 14, 1966   C. COLE ETAL   3,255,537
TEACHING MACHINE
Filed Dec. 28, 1962   2 Sheets-Sheet 2
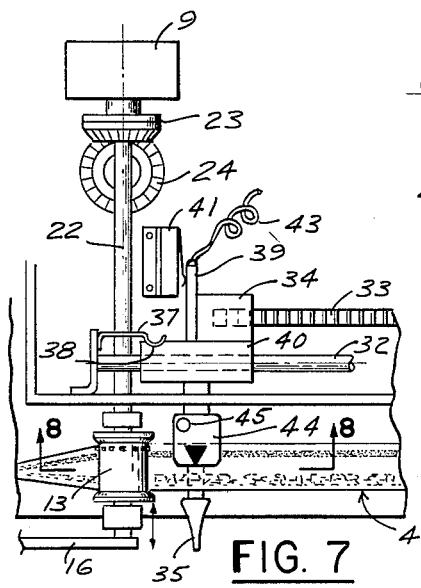
FIG. 7
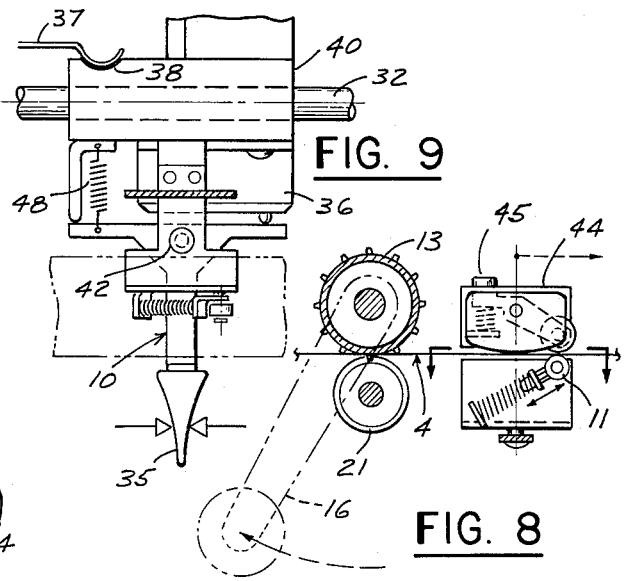
FIG. 9
FIG. 8
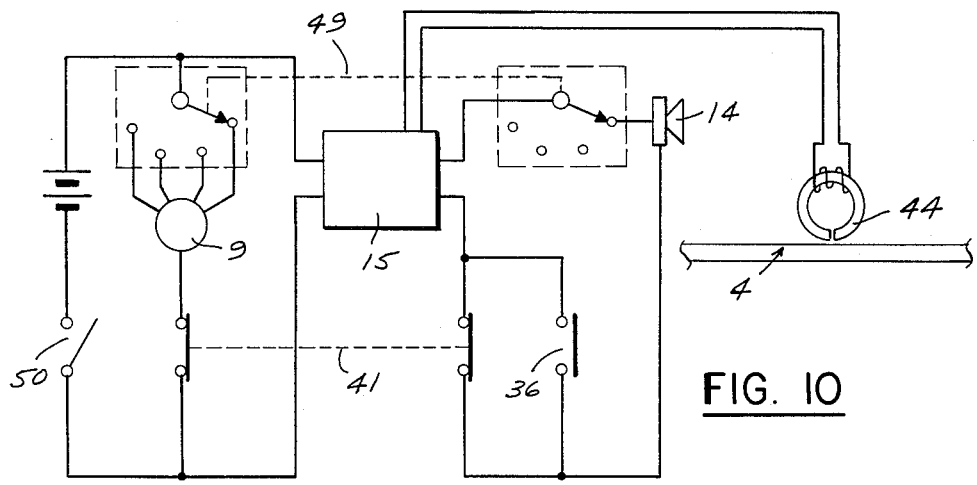
FIG. 10
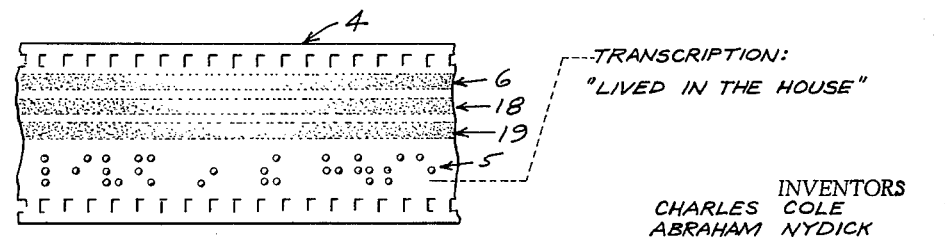
FIG. 11
TRANSCRIPTION:
"LIVED IN THE HOUSE"
INVENTORS
CHARLES COLE
ABRAHAM NYDICK
BY
ATTORNEYS 3,255,537
TEACHING MACHINE
Charles Cole, New York, N.Y., and Abraham Nydick, Newtown, Pa., assignors to Emmett R. Salzberg, Oceanside, N.Y.
Filed Dec. 28, 1962, Ser. No. 248,137
6 Claims. (Cl. 35—35)

This invention relates to teaching machines. More particularly, it is directed to devices for learning and practicing the audible equivalents of tactile or visible information such as braille, words, pictures and music.

Learning braille is a tedious process. The constant attention of an instructor is required because the blind cannot check the meaning of a braille character by referring to its visible equivalent. What is needed is a teaching machine with which the blind can conveniently learn braille.

The same problems exist in the self-teaching of other forms of information. For example, in teaching a written language, either native or foreign to the student, or in teaching reading, music, vocabulary or pronunciation, a similar need for self-appraisal exists. The present invention offers a solution to these problems.

Because the device of the present invention teaches by the presentation of the tactile or visible information synchronously with an audible rendition of the same information, it is of particular value to the blind, to whom self-teaching of braille has been until now impossible.

It is, therefore, a principal object of this invention to provide a device which enables the student to teach himself the meaning of tactile or visible information, including braille, by conveniently synchronizing it with its audible equivalent.

Another object of the invention is to provide a device that allows the blind to learn braille without an instructor other than initial instruction in the use of the device.

Another object of the invention is to provide a useful teaching device that allows the student to study at his own learning pace and conveniently to repeat all or any portion of a lesson as many times as desired in accordance with sound educational principles.

A further object of the invention is to provide a teaching machine which enables the student to acquire knowledge and to engage in self-examination by the correlation of the audible intelligence with the tactile or visible intelligence corresponding thereto.

The objects of this invention are provided by a device, which in its fundamental aspects comprises: a base; an intelligence carrying element, such as a tape or other instrumentality as employed in the sound reproduction art, said element bearing (a) tactually sensible or visible intelligence and (b) a recording of audibly reproducible intelligence which is coordinated with (a); a suitable support or supporting means for the intelligence carrying element; and means for bringing the tactually sensible or visible intelligence into "display position," i.e., the position where it can be felt by the blind or is visible to the student, and for reproducing the audible intelligence coordinated therewith.

The foregoing, as well as further, objects and advantages of the invention will become apparent and more fully understood from the following detailed description thereof when read with the accompanying drawings wherein:

FIG. 7 is an enlarged view of a portion of the structure shown in FIG. 4;

FIG. 8 is an enlarged view of a portion of the device taken on line 8—8 of FIG. 7;

FIG. 9 is an enlarged view of a portion of the structure shown in FIG. 7;

FIG. 10 is a schematic diagram of the electrical circuitry embodied in the machine of FIG. 1; and FIG. 11 is a detailed view of the information bearing tape used in the device of FIG. 1.

Figure 1:
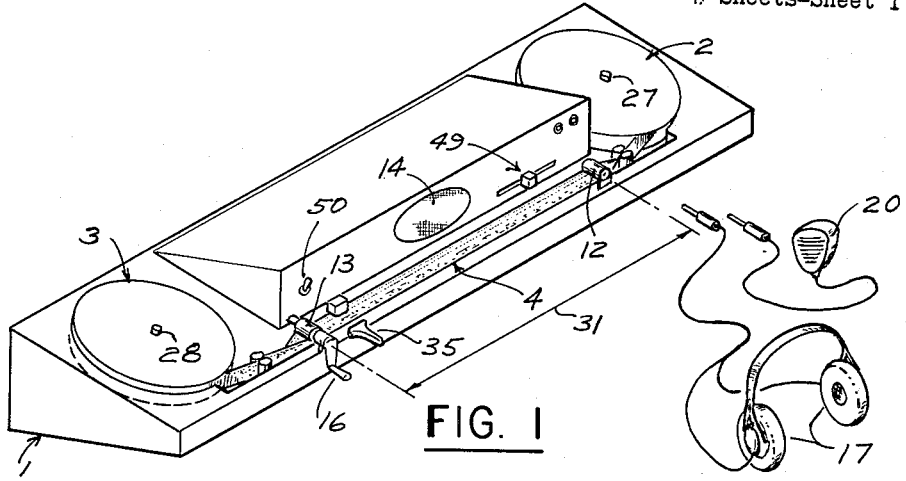
FIG. 1 is a perspective view of one embodiment of a teaching machine constructed according to this invention.
Figure 2:
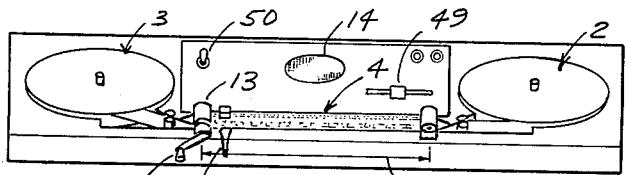
FIG. 2 is a front view of the device of FIG. 1, showing the external details.
Figure 3:
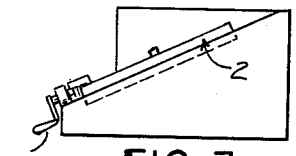
FIG. 3 is a side view of the device of FIG. 1.

In the drawing, the device comprises generally a base 1 on which is rotatably mounted a reel 2 for the supply and a reel 3 for the take-up of a tape 4. This tape may be made of paper or motion picture film base, including the recently developed polyester, Mylar, or any other suitable flexible material. Tape 4 is provided with at least two channels of intelligence, one of which can be felt or seen, and the other reproduced audibly. As shown in FIG. 11, channel 5 is tactile or visible, as for example, braille or printing. The other channel 6 is a recording of audibly reproducible intelligence corresponding to the intelligence on channel 5. The intelligence on channel 6 is stored, for example, on a magnetic iron oxide coating on tape 4.

The information on the audible channel 6 of tape 4 is synchronized in position with, and corresponds in meaning to the information on the tactile or visible channel 5.

Two means are used to move tape 4: manual means and motor means. Tape 4 can be moved by motor 9 into display position 31 which lies between idler 12 and sprocket-idler 13–21. In the display position 31, the tape 4 can be touched or seen.

Tape 4 can be moved manually in two ways. It can be moved by means of playback assembly 10, which is slidably disposed with respect to the display position and thus is free to move back and forth parallel to the tape 4, or by crank handle 16. Playback assembly 10, when not latched into fixed position for motor operation, can be manually moved back and forth; and the pinch roller 11 will bring the tape 4 from the right to the left. When the playback assembly is moved from left to right, the pinch roller 11 is released and tape 4 remains in place. As the playback assembly moves from left to right, the information on the audibly reproducible channel 6 is made audible by means of pickup head 44, amplifier 15 and speaker 14 or head phones 17. The finger button 45, when pressed, allows for lifting its pivoted roller off the tape 4, thus providing for the playing over and over again of the same portion of the audible channel on tape 4.

The second method of manually moving tape 4 is accomplished by means of crank handle 16 which moves sprocket wheel 13. Tape 4 is perforated to engage the teeth of sprocket wheel 13.

Figure 5:
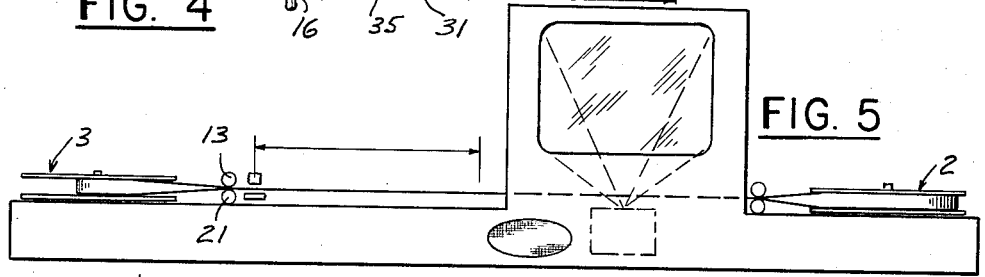
FIG. 5 is a view of a modified embodiment of the machine which provides for the projection of visible information on a screen.
Figure 6:
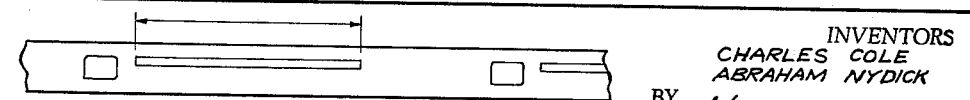
FIG. 6 is a view of a portion of the intelligence bearing tape used in the embodiment shown in FIG. 5.

The device may be integrated with a projector as shown in FIG. 5. This allows for the projection of a word, a sentence or a picture on a screen so that the projection may be observed by a group of students at the same time that the associated audible information is being heard.

As shown in FIG. 11, the tape 4 may be provided with additional information recording and reproducing channels 18 and 19. By means of microphone 20, in combination with amplifier 15, pickup head 44 and speaker 14 or head phones 17, the student of a foreign language can record his pronunciation of a foreign word or sentence on channels 18 or 19 if the device be provided with means therefor. He thus would be able to compare his pronunciation with that of an expert which is already recorded on another channel.

Figure 4:
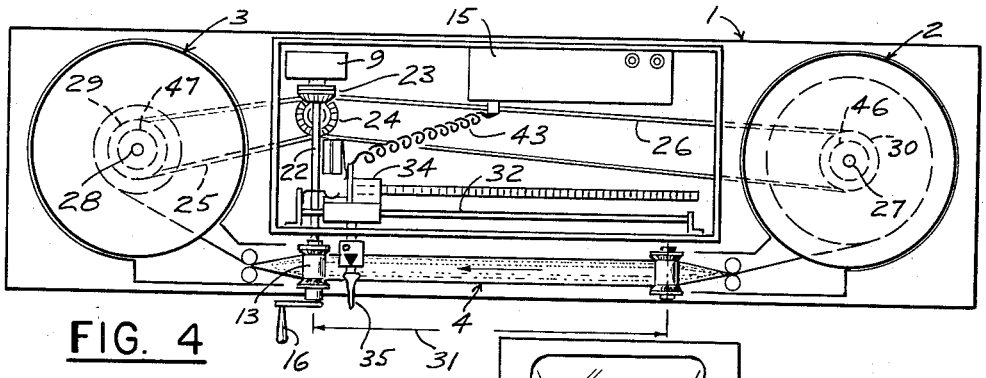
FIG. 4 is a plan view of the device of FIG. 1, with the cover shown in FIG. 2 removed to show the internal construction of the machine.

In greater detail, the features of the invention are as follows:

In FIG. 4, the supply reel 2 and take-up reel 3 are mounted on the base 1 by means of spindles 27 and 28, respectively. Tape 4, provided with the plurality of information channels 5, 6, etc. is unwound from supply reel 2 and set between idler 12 and sprocket-idler 13–21 and then attached to the take-up reel 3. The display position 31 of tape 4 lies between idler 12 and sprocket-idler 13–21.

As shown in FIG. 8, sprocket-idler 13–21 comprises and idler spring 21 loaded into contact with sprocket 13. The two are manually disengageable against the spring loading to allow for the insertion and removal of tape 4.

In operation, the tape 4 is positioned under the playback assembly 10. The motor 9 is connected with and drives the shaft 22 on which is mounted bevel gear 23 which meshes slip-drive 24, which in turn drives belts 25 and 26. The reel spindle 27 is mounted on a clockwise drag clutch 46; and reel spindle 28 is mounted on a counter-clockwise drag clutch 47. Pulleys 29 and 30 are mounted on spindles 28 and 27, respectively. The drive belts 25 and 26 connect the pulleys 29 and 30 to the slip-drive 24. Motor 9 is thus capable of driving reels 2 and 3 and sprocket 13 which moves tape 4 from reel 2, past the idler 12 through the display position 31, past sprocket idler 13–21 and on to the reel 3.

Fixed and parallel to the front of base 1 are a guide bar 32 and a toothed rack 33. As shown in FIG. 7, the playback assembly 10 is mounted on sleeve 40 which rides on guide bar 32. The assembly 10 includes a speed governor 34 which engages the toothed rack 33. In lieu of the toothed rack 33, there may be employed any other suitable means which, in contact with the governor, provides a constant linear speed. The speed governor 34 can apply a constant force opposing the motion of playback assembly from left to right, but it applies but little or no resistance to the motion thereof from right to left. The drag characteristics of speed governor 34 are so adjusted that the entire playback assembly 10 will move under normal finger pressure from left to right at a constant speed, i.e., the same speed as that used originally in recording the sound on the audible information channel. With practice, the student will readily use the proper speed to obtain optimum sound reproduction.

The playback assembly 10 also includes a finger lever 35, pivoted at 42 and engageable with switch 36. However, the loading of spring 48 keeps the lever 35 normally disengaged from the switch 36. The detent spring 37 mounted on the base 1 provides latching which holds the playback assembly 10 in fixed position, when the detent spring is engaged in the detent notch 38. The audible information pickup head 44 is mounted over a part of finger lever 35 in order to scan the audible information channels on tape 4.

A cable 43 connects the playback assembly 10 to the amplifier 15. The information on the audible channels is picked up by the head 44 and transmitted through cable 43 to amplifier 15 and to the speaker 14 or the head phones 17. If the pickup head 44 and the playback assembly 10 are integrated with the amplifier 15 and the speaker 14, and provided with a source of power, such as a battery, the cable 43 becomes unnecessary.

The control circuit of motor 9 comprises control switch 49 and power switch 50. This controls the direction and speed of the tape 4 during playback, recording, fast forward and fast reverse. Fast tape speeds are used to locate particular sections of the tape and to rewind the tape. When using either manual or motor operation, the student with unimpaired eyesight can visually or aurally locate the beginning of the last portion he wants to repeat. Tape 4 may be provided with consecutive numbers or other suitable coding at regular intervals. Likewise, the blind student can locate the portion he wants to repeat either aurally or tactually. This feature of random imformation location without visible means is extremely useful to the blind and makes possible, for the first time, self-teaching for blind students.

Switch 36 is a double pole, double throw switch. One contact is closed when undepressed and is in parallel with the normally closed switch 41. The second contact of switch 36 is normally open when undepressed and controls the operation of the audible information playback system when the device is being manually operated. Thus, when the finger lever 35 of the playback assembly 10 is moved to the right, the audible information playback circuit will be completed for manual operation. This renders audible the information on tape 4.

Besides the manual method, the motor 9 can be used to repeat portions of the lesson. When the beginning of the section to be repeated is located, the playback assembly is latched into the detent notch 38 and the finger lever 35 is released, thus closing switch 41 which energizes motor 9 and drives the tape 4. The tape 4 will pass under head 10 and repeat the audible information desired.

It will thus be seen that the instant invention provides a teaching device which comprises: (a) the basic component shown, or the equivalents thereof that provide the fundamental functions described and, optionally, (b) the additional component, or the equivalents thereof, that provide means for a selection of (1) automatic or manual operation in whole or in part, or in any combination of such combination, or (2) the supplemental operations described, or a combination of (1) and (2).

It will be understood that the foregoing description of the invention and the embodiment set forth is merely illustrative of the principles thereof. Accordingly, the appended claims are to be construed as defining the invention within the full spirit and scope thereof.

We claim:

1. A support comprising a length of material for magnetically recording audibly reproducible information, and a co-extensive length of tactually sensible characters on said support, said characters correlated with said information.

2. The support of claim 1 in which the characters are braille characters.

3. In an information storage and retrieval system, the combination comprising
    (1) a single member including (i) an audibly reproducible element having linear extent, and (ii) a co-extensive tactually sensible information containing element,
    (2) means to render (1) (i) audible, and
    (3) means for keeping (1) stationary and moving means (2).

4. A teaching device comprising:
    a base;
    an intelligence carrying element comprising a tape bearing
        (a) at least one of (i) tactually sensible and (ii) visible intelligence, and
        (b) a recording of audibly reproducible intelligence coordinated with the intelligence on (a);
    a support for said intelligence carrying element comprising reels for mounting the tape;
    and means:
    (1) to bring intelligence (a) into position for display, and to maintain the intelligence in said position; and
    (2) means movable relatively to said intelligence carrying element to repetitively reproduce the audible intelligence on (b) while (a) is held in the maintained position.

5. A device comprising:

a base;

an intelligence carrying area having at least two areas of different types of intelligence, one of said areas having a recording of audible intelligence which is coordinated with the other type of intelligence; and means as hereinabove described for (a) the display of the mentioned other type of intelligence, and (b) effecting reproduction of the audible intelligence coordinated therewith, including means to maintain the mentioned other type of intelligence stationary and means movable relatively to said intelligence carrying area to repetitively reproduce the audible intelligence while the other type of intelligence is maintained in stationary position.

6. An information storage and retrieval system comprising:

a base;

an information storage element having the following types of information:

(a) audible;

and at least one of (b) tactual, and (c) visible;

means for displaying the information storage element; and means for selectively effecting one of the following combinations:

(1) reproducing the audible information while the information storage element is stationary: and (2) reproducing the audible information while the information storage element is moving, said last named means being movable relatively to said information storage element when effecting combination (1).

References Cited by the Examiner

UNITED STATES PATENTS

| | | | |
|---|---|---|---|
| 2,091,146 | 8/1937 | Hamilton. | |
| 2,548,011 | 4/1951 | Frost | 35—35.3 |
| 2,822,425 | 2/1958 | Hicks | 35—35.3 |
| 2,950,543 | 8/1960 | Ritter et al. | 35—35.3 |
| 3,026,634 | 3/1962 | Irazoqui | 35—35.3 |
| 3,032,164 | 5/1962 | Watari | 197—6.1 |
| 3,103,074 | 9/1963 | Daugherty | 35—35.1 |
| 3,142,909 | 8/1964 | Irazoqui | 35—35.3 |

EUGENE R. CAPOZIO, *Primary Examiner.*

LAWRENCE CHARLES, *Examiner.*

WILLIAM GRIEB, *Assistant Examiner.*